United States Patent [19]
Scott

[11] 4,164,545
[45] Aug. 14, 1979

[54] USE OF MANGANESE DIOXIDE ABSORBENT IN TREATING WASTE GASES

[75] Inventor: Richard L. Scott, Bartlesville, Okla.

[73] Assignee: Phillips Petroleum Company, Bartlesville, Okla.

[21] Appl. No.: 948,132

[22] Filed: Oct. 3, 1978

[51] Int. Cl.$^2$ .............................................. B01D 53/34
[52] U.S. Cl. ..................................... 423/239; 423/49; 423/244; 423/395; 423/605; 423/DIG. 4; 423/DIG. 14
[58] Field of Search ............... 423/235, 239, 244, 395, 423/49, 51, 605, DIG. 4

[56] References Cited

U.S. PATENT DOCUMENTS

| | | | |
|---|---|---|---|
| 1,266,731 | 5/1918 | Westby | 423/49 |
| 3,150,923 | 9/1964 | Bienstock et al. | 423/244 |
| 3,330,096 | 7/1967 | Zimmerly | 423/49 |
| 3,780,158 | 12/1973 | Welsh | 423/49 |
| 3,975,498 | 8/1976 | Miyazaki et al. | 423/239 |

OTHER PUBLICATIONS

Kainz et al., "Mikrochemica Acta" (Vienna), 1962, pp. 241-248.
Herve; D., "Industrie Minerale" vol. 3, 1977, (France), pp. 173-180.

*Primary Examiner*—G. O. Peters

[57] ABSTRACT

A system for treating waste gas in which the waste gas is contacted with an absorbent which contains manganese dioxide; thereafter contacting the absorbent with water to solubilize salts of manganese with an acidic ion exchange resin that retains manganese and passes acids formed from manganese salts; contacting the ion exchange resin and contained manganese with dilute nitric acid to obtain $Mn(NO_3)_2$ solution; and precipitating $MnO_2$ from the $Mn(NO_3)_2$ solution.

6 Claims, 1 Drawing Figure

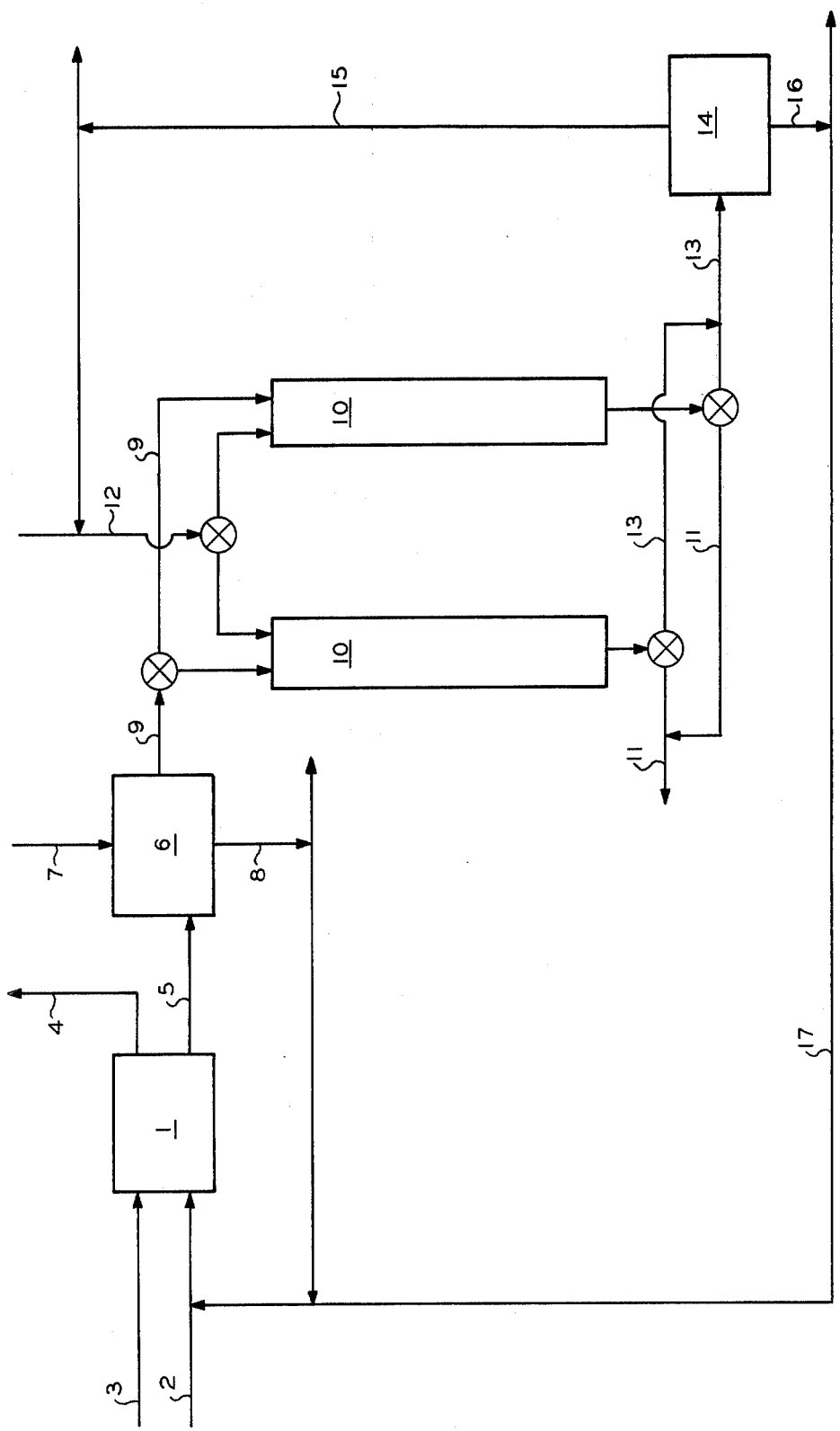

USE OF MANGANESE DIOXIDE ABSORBENT IN TREATING WASTE GASES

BACKGROUND OF THE INVENTION

This invention relates to the treatment of waste gases. In another aspect of the invention it relates to the recovery of manganese dioxide from a spent absorbent. In a specific aspect of the invention it relates to the use of ion exchange resins in the recovery of manganese compounds. In another specific aspect of the invention it relates to a process for removing oxides of sulphur and nitrogen from waste gases, such as smelter gases, flue gases, or stack gases with subsequent recovery and recycle of absorbent materials used in the treating process.

Contamination of the atmosphere by oxides of sulfur and nitrogen has been a public health problem for many years, because of the effect on the human respiratory system, on plant life, and corrosive attack on many metals, fabrics, and building materials. Many methods have been proposed for removing oxides of sulfur and nitrogen from waste gases. Such processes range from simply scrubbing the waste gases with water or aqueous solutions or suspensions of suitable absorbents to processes involving the use of solid absorbents which, when spent or saturated, can be processed for recovery of valuable materials, regenerated for recycle or removed from the process for disposal.

Many of the prior art proceses suffer disadvantages. Some of these processes are inefficient in removal of the oxides of sulfur and nitrogen from the waste gases. Other of the processes are more efficient in removal of oxides from the waste gases but require elaborate means of treatment or regeneration of spent absorbent, such as electrolysis, oxidation, or high temperature calcination, as well as, expensive treatment prior to disposal, use, or sale of by-products. This invention overcomes many of the disadvantages known in the prior art processes by providing for efficient removal of oxides of nitrogen and sulfur from waste gases, simplified and less expensive regeneration means for spent absorbent, as well as, recovery of by-products in forms which are readily usable or marketable.

It is therefore an object of this invention to provide a method for treating waste gases to remove contaminants. It is another object of this invention to provide a method for the removal of sulfur oxides and nitrogen oxides from stack gases by treatment with an absorbent containing manganese dioxide. It is another object of this invention to provide a method for recovering manganese dioxide from absorbent spent in treating waste gases.

Other aspects, objects and the various advantages of this invention will become apparent upon reading the specification, studying the drawing, and studying the appended claims.

STATEMENT OF THE INVENTION

According to this invention, in a system for treating waste gas with an absorbent which contains $MnO_2$, a method is provided for recovering manganese from the spent absorbent. In the method spent absorbent is contacted with water to solubilize salts of manganese; solubilized salts of manganese are contacted with an acidic ion exchange resin that retains mangangese and passes acids formed from the manganese salts; the ion exchange resin and contained manganese is contacted with dilute nitric acid to obtain $Mn(NO_3)_2$ solution; and $MnO_2$ is precipitated from the $Mn(NO_3)_2$ solution.

In another embodiment, the invention can be stated as providing a process for treating waste gases in which the waste gas is contacted with an absorbent that contains manganese dioxide; thereafter the spent absorbent is contacted with water or aqueous solution to solubilize manganous sulfate and manganous nitrate; the resultant aqueous phase is passed over an acidic ion exchange resin which retains manganese and passes nitric acid and sulfuric acid; manganese is recovered as a manganous nitrate solution from the ion exchange resin by elution with dilute nitric acid; and the resultant solution containing manganous nitrate is heated to precipitate manganese dioxide.

The waste gases suitable for treatment by means of the present invention can originate from a wide variety of sources, such as chemical processes, fossil fuel-burning furnaces, power plants, engine exhaust, and the lik. Such waste gases can contain from very small amounts to very large amounts of oxides of nitrogen and/or sulfur. For example, waste gases containing from 0.01 percent by volume or less to 10 percent by volume or more of sulfur dioxide or nitrogen oxides are frequently encountered.

The treating agents or absorbents useful in treating the waste gases according to the process of this invention are selected from a wide variety of manganese dioxide-containing materials, ranging from crude, natural materials containing a low percentage of manganese dioxide to high purity manganese dioxide. Ores, particularly pyrolucite, and deep sea nodules are examples of naturally occuring materials which are suitable for use in the present invention.

Referring now to the drawing which is a schematic representation of the major features of this invention. Into treating zone 1 via conduit 2 is introduced absorbent which contains finely divided manganese dioxide. Waste gas is introduced into treating zone 1 via conduit 3. Treated waste gas from zone 1 then passes through conduit 4 to the atmosphere or to further treating zones, as desired, to remove materials such as hydrocarbon gases. The spent solid treating agent from treating zone 1 then passes through conduit 5 to washing zone 6 where it is contacted with water or an aqueous solution which solubilizes water-soluble manganese salts, such as manganous sulfate and manganous nitrate. The remaining solids from the washing zone are removed via conduit 8 for disposal, further treatment as desired, or for recycle to the treating zone if sufficient manganese dioxide remains. The aqueous phase from the washing zone, containing manganous sulfate and manganous nitrate is passed via conduit 9 to exchange zone 10 which contains an ion exchange resin in the acidic form. Manganese values are retained in the exchange zone while the effluent contains sulfuric acid and/or nitric acid. Subsequent introduction of dilute nitric acid into the exchange zone 10 via conduit 12 results in elution of an aqueous manganous nitrate solution via conduit 13 and regeneration of the ion exchange resin to the acidic form for further treatment with aqueous phase from washing zone 6. In heating zone 14, heat is applied to the aqueous manganous nitrate solution to precipitate manganese dioxide therefrom and to liberate nitrogen oxides which can subsequently be oxidized and dissolved in water to form nitric acid for removal via conduit 15 for subsequent use as, for example, in exchange zone 10. The manganese dioxide removed from heating zone 14 via conduit 16 is recovered for further use as, for example, recycle via conduit 17 to treating zone 1.

A plurality of exchange zones can be employed in the process of this invention, as illustrated in the drawing, such that at least one zone elutes sulfuric acid and/or nitric acid while at least one outer zone is being treated with dilute nitric acid to remove the manganese values and to regenerate the ion exchange resin into the acidic form.

The waste gas can be introduced into treating zone 1 at any desired temperature. The temperature of a waste gas emitted from its origin, for example, 50° C. to 500° C., is suitable for the treating zone. It is not, therefore, necessary either to heat or cool the waste gas prior to introduction into the treating zone. The waste gas can be passed through the treating zone at any velocity suitable for reducing the levels of oxides of sulfur and nitrogen to acceptable levels. For example, gas hourly space velocities (volume of gas/volume of absorbent/hour) in the range of about 10 to about 10,000 can be employed.

If desired, weakly acidic or weakly basic aqueous solutions can be employed to wash the spent absorbent from treating zone 1 into washing zone 6.

Ion exchange resins are well known in the art. Thus it is well within the knowledge of one of average skill in the art to select suitable ion exchange resins for use in exchange zone 10. Examples of suitable resins include sulfonated copolymers of styrene and divinylbenzene, and copolymers of unsaturated carboxylic acids, e.g. acrylic acid or methacrylic acid, and divinylbenzene. Many such resins are commercially available under a variety of trade names, such as Amberlite (Rohm and Haas Co.), Dowex (Dow Chemicl Co.), Ionac (Ionac Chemical Corp.), and Duolite (Diamond Alkali Corp.). The strongly acidic ion exchange resins such as sulfonate styrene/divinylbenzene copolymers are especially preferred.

The precipitation of manganese dioxide in heating zone 14 will generally occur at temperatures within the range of about 50° C. to 200° C.

The above description of the invention process is meant to lead one skilled in the art to the conclusion that, in addition to removing troublesome oxides of nitrogen and sulfur from waste gases and converting them into marketable by-products, this invention also provides a means of upgrading relatively low value, crude, naturally occuring materials containing manganese dioxide into high value, high purity manganese dioxide. Of course, the recovered solids from washing zone 6, depending upon their composition and value, can be dumped, further treated as desired to recover components of value, or if sufficient manganese dioxide remains therein, can be recycled for further use in the treating zone.

The following calculated example illustrates the process of this invention in treating a waste gas containing sulfur dioxide and nitrogen oxides with a manganese-containing ore to reduce the amount of sulfur and nitrogen oxides in the gas and to recover sulfuric acid, nitric acid and manganese dioxide as valuable products.

A crushed manganese ore containing 37 percent by weight manganese (calculated as the metal) is employed as a fixed for bed for the treatment of a simulated flue gas of the following composition:

| Component | Weight Percent |
|---|---|
| $SO_2$ | 0.25 |
| $NO_x$ | 0.25 |
| $CO_2$ | 12.5 |
| $O_2$ | 6.0 |
| $H_2O$ | 6.0 |
| $N_2$ | 75.0 |

The flue gas at 300° C. is passed through a fixed bed of absorbent at a gas hourly space velocity of 750. The treated gas stream contains 0.005 weight percent each of $SO_2$ and nitrogen oxides ($NO_x$).

The used absorbent which has absorbed 20 percent of its own weight of $SO_2$ and $NO_x$ is removed from the treating bed and washed with water to remove soluble salts. The washed absorbent, upon drying, contains 30 percent by weight manganese (calculated as the metal) and is returned to the treating zone for further treatment with flue gas.

The wash solution obtained from washing the spent absorbent is passed through a fixed bed of strongly acidic ion exchange resin (Amberlite IR-200, a sulfonated styrene/divinylbenzene copolymer) in the acid form. The effluent from the ion exchange column is an aqueous mixture of sulfuric acid and nitric acid.

The exchange zone containing the manganese values is treated by passing there through an aqueous solution of nitric acid (5 weight percent nitric acid based on the total aqueous solution). The effluent from the acid-treated exchange zone is heated at 175° C. for 2 hours until precipitation of manganese dioxide is complete. Recovery of the manganese dioxide by filtration, washing with water, drying and dehydration results in finely divided, highly pure manganese dioxide. The recovery of $MnO_2$ is greater than 90 percent of theoretical based on the total manganese salts washed from the spent absorbent.

I claim:

1. In a system for treating waste gas with an absorbent which contains $MnO_2$ a method for recovering manganese from the spent absorbent said method comprising:
    (1) contacting spent absorbent with water or aqueous solution to solubilize salts of manganese;
    (2) contacting solubilized salts of manganese with an acidic ion exchange resin that retains manganese and passes acids formed from manganese salts;
    (3) contacting ion exchange resin and contained manganese with dilute $HNO_3$ to obtain $Mn(NO_3)_2$ solution; and
    (4) precipitating $MnO_2$ from said $Mn(NO_3)_2$ solution.

2. A method of claim 1 wherein $MnO_2$ is precipitated from $Mn(NO_3)_2$ solution by heating to a temperature within the range of about 50° C. to about 200° C.

3. A process for treating waste gases which comprises:
    (1) contacting the waste gas with an absorbent that contains manganese dioxide;
    (2) contacting the spent absorbent with water or aqueous solutions to solubilize manganous salts formed in the absorbent;
    (3) contacting the resultant aqueous phase with an acidic ion exchange resin that retains manganese but passes acids formed from the salts of manganese;

(4) eluting the ion exchange resin with dilute nitric acid to recover manganese as a manganous nitrate solution; and (5) heating the manganous nitrate solution to precipitate manganese dioxide.

4. A method of claim 2 wherein the waste gas contains oxides of sulfur and nitrogen which on contact with the absorbent are retained in the form of manganous sulfate and manganous nitrate.

5. A method of claim 4 wherein the acidic ion exchange resin retains manganese and passes nitric acid and sulfuric acid.

6. A method of claim 3 wherein the manganese dioxide from step (5) is recovered and recycled with absorbent to step (1).

* * * * *